UNITED STATES PATENT OFFICE.

HENRY JULIAN ALLEN, OF PORT BYRON, NEW YORK.

PRESERVED COMPOUND FOR MINCE-PIES.

SPECIFICATION forming part of Letters Patent No. 268,972, dated December 12, 1882.

Application filed June 3, 1881. (Specimens.)

*To all whom it may concern:*

Be it known that I, HENRY JULIAN ALLEN, of Port Byron, in the county of Cayuga and State of New York, have invented a new and Improved Compound for Mince-Pies; and I do hereby declare that the following is a full, clear, and exact description of the same.

The object of this invention is to furnish a compound for mince-pies so prepared that it will keep in any climate for any length of time without fermenting, molding, or decaying, and which will not be liable to the attacks of insects or worms, and may be conveniently stored, shipped, and handled.

Mince-pie compounds have heretofore been prepared in the wet state with free water present in the shape of wine, cider, or other liquid, and put up in cans, jars, and barrels, which condition of the compound involves a liability to ferment, decay, or mold, and in which state the compound is not easily handled in definite quantities.

My invention, while employing no substantially new ingredients, is founded upon the combination of old ingredients, which are combined both chemically and mechanically under peculiar conditions that enable me to produce a practically dry compound that may be put up as a dry solid in separate packages, which remain stable and keep sweet and pure under all ordinary influences.

My invention consists essentially in the combination of cooked meats, sugar, and desiccated apples or other fruit and spices. To make a stable and dry compound the cooked meat must be deprived of its water, and if this is done by heat or evaporation the meat becomes destructively carbonized to such an extent that it forever loses its identity as meat, and when the compound is made into a pie the meat remains hard and indigestible. In my invention a peculiar reaction takes place between the cooked meat, the sugar, and the dried fruits when compounded dry, as follows: The sugar, by its affinity for the moisture of the meat, absorbs most of the said water in the meat, and, passing into the pores of the meat, crystallizes there, so as to thoroughly preserve the meat without carbonization, and the water which passes out of the meat into the remaining sugar causes the latter to become liquefied into a sirup of meat, which is at once taken up by the spongy desiccated apples and dry spices, where it can remain without prejudice, and where it serves as an absorbent or retainer to hold the aromatic oils of the flavoring-spices that may be employed.

In preparing the compound the beef or other meat is deprived of a part of its free water by cooking, boiling, steaming, or other means, and is cut, chopped, ground, grated, or otherwise made fine enough for use in pies. The dried apples or other dried fruits are chopped or ground to a suitable fineness. To the meat, during the process of preparation or afterward, are added the fruit, sugar, spices, and salt. These ingredients are thoroughly rubbed or mixed together dry, and the reactions before referred to take place and continue until an equilibrium is established and a stable compound formed. The compound is then packed in suitable packages for use, sale, and transportation.

The proportional quantities of the ingredients are beef, one pound; sugar, one pound; apples, one and one-eighth pound; spice, one-fourth pound; currants, one pound; raisins, one pound, and salt, one ounce; but these proportions may be varied as the taste of the operator or buyer may dictate; and, if desired, a small quantity of starch may be added to the compound.

The merit and novelty of my invention lie in the fact that in this compound the sugar absorbs from the meat the greater part of the remaining moisture, becomes partly liquefied, is partly absorbed by the dried fruits and spices, effectually permeating and coating the particles of the compound, and thus preserving their aromatic qualities, and while the meat is practically desiccated by the sugar, it is dried without destructive carbonization, and when the compound is prepared for use with water the meat becomes soft and digestible, and is restored to its original state of fresh cooked meat.

The spices used may be a mixture of cloves, cinnamon, allspice, pepper, and nutmeg, some or all, which, in addition to their flavoring and preserving effects, guard the compound from the attacks of insects and worms. A small quantity of wine, brandy, or other liquor may be added to the compound while in course of preparation, or afterward, if desired. This, however, is quickly absorbed by the dry products, and creates no sensible moisture in the composition.

An important commercial advantage of my dry mince-meat is that one pound of the same is equivalent to five pounds of the wet mince-meat, and it is much more easily transported, with less cost for freight, and also at lower freight rates. Furthermore, it is not injured by freezing, which has a disastrous result with compounds of a liquid or semi-liquid character.

I am aware of the fact that the ingredients named by me are not new in a mince-pie compound when compounded in a wet state; and I am also aware that desiccated compounds of meats and cereals have been prepared to form pemmicans, dried soups, &c., and I do not claim such.

What I claim as new is—

As an improved article of manufacture, a dry mince-pie compound composed essentially of cooked meat, dried apples or other fruit, sugar, and spices, compounded dry, whereby the meat is desiccated and preserved without being carbonized and a dry stable composition formed, substantially as herein shown and described.

H. JULIAN ALLEN.

Witnesses:
G. W. LATHAM,
J. D. JOHNSON.